United States Patent Office 3,132,821
Patented May 12, 1964

3,132,821
CAMERA SPOOL WITH CORE EJECTION FIXTURE
Robert B. Herden, Webster, N.Y., assignor, by mesne assignments, to Minnesota Mining and Manufacturing Company, St. Paul, Minn., a corporation of Delaware
Filed Jan. 19, 1961, Ser. No. 83,798
1 Claim. (Cl. 242—68)

This invention relates to a split spool assembly intended primarily for holding photographic film (e.g., motion picture film) but useful also for holding any other desired type of strip material where it may be desirable to wind such material in a roll of successive convolutions and where it may be advantageous to have a split spool, in which the side flanges can be separated from each other to remove the convolutions from the spool by an axial motion rather than having to unwind the material from the spool convolution by convolution in a tangential direction.

An object of the invention is the provision of a generally improved and more satisfactory split spool assembly.

Another object is the provision of a split spool assembly particularly adapted for high speed rotation and safe for use under the high speed conditions encountered, for example, in an extreme high speed motion picture camera for scientific or technical use.

A further object is the provision of a spool assembly of such simple construction that it can be easily assembled or disassembled in a photographic darkroom, the assembly having no small loose parts liable to be lost or mislaid in a photographic darkroom.

These and other desirable objects may be attained in the manner disclosed as an illustrative embodiment of the invention in the following description and in the accompanying drawings forming a part hereof, in which.

Figures 1, 2:
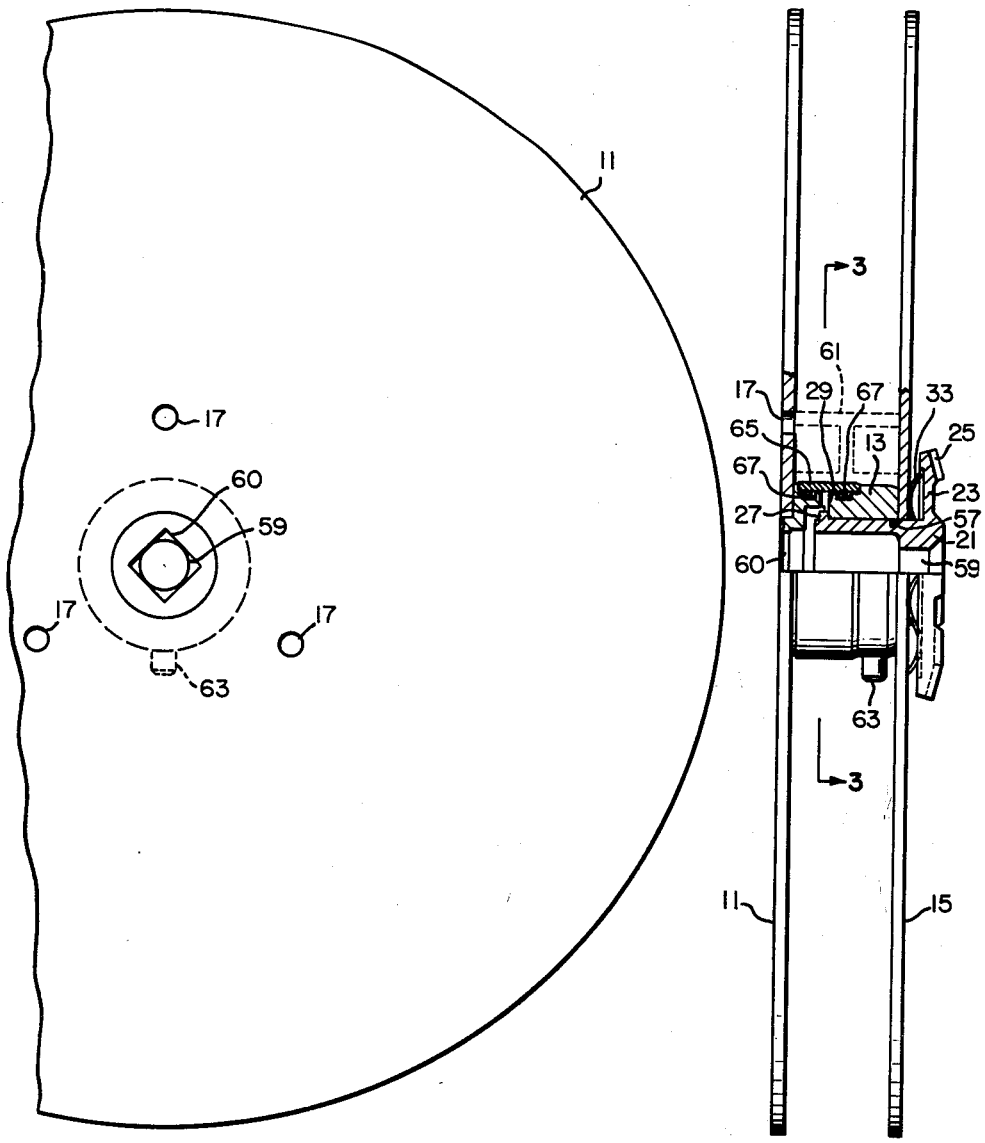
FIG. 1 is a fragmentary side elevation of a split spool assembly according to a preferred embodiment of the present invention.
FIG. 2 is a composite view, the lower part being an edge view of the spool shown in FIG. 1, the upper part being a substantially radial section through a portion of the construction near the rotary axis, showing also a core in broken lines.

Referring now to the drawings, the spool assembly comprises a first side flange 11, which may be called the inboard flange, and which is permanently secured rigidly to the hollow hub member 13 at one axial end thereof. There is also a second side flange 15, which may be called the outboard flange, which fits detachably against the opposite end of the hub member 13. The two flange members 11 and 15 are both circular and of the same diameter. They may be identical with each other except that the flange 11 is permanently fastened to the hub 13 while the flange 15 is not, and except that the flange 11 preferably also has ejector pin holes 17 into which the pins of an ejector fixture may extend to help in pushing a core axially off of the hub 13 when it is desired to remove such core after the outboard flange 15 has been removed, and except that the central opening of the flange 15 is somewhat different from that of the flange 11.

Preferably both flanges 11 and 15 are made of opaque material, such as sheet metal, so that the spool may be used for daylight loading and unloading of a photographic camera.

The flange 15 is held detachably in assembled position by a fastening sleeve or bushing (which may also be called a lock nut) indicated in general at 21. This bushing has an enlarged head portion 23 having serrations 25 around its marginal portion, for easy turning by the fingers of the user, or more usually by the palm of the hand. The main body of the member 21 extends slightly loosely through a central hole in the flange 15 (this part of the construction being further described below) and fits snugly but slidably into the interior of the hub 13.

There are cooperating bayonet connection parts on the members 13 and 21 to hold them in assembled position but to allow release and removal when desired. At the inner end of the sleeve or lock nut 21 there are a plurality of bayonet lugs projecting radially outwardly as indicated at 27, three such lugs preferably being provided at points equally spaced angularly from each other. When the parts are in the assembled position shown in FIG. 2, these bayonet lugs 27 lie tight in axial recesses 29 formed in the radial surface 31 in the hub 13, and are held snugly in such recesses 29 by the outward pull on the sleeve or nut 21 produced by a corrugated spring 33 interposed between the enlarged head 23 of the sleeve and the side flange 15.

Figure 3:
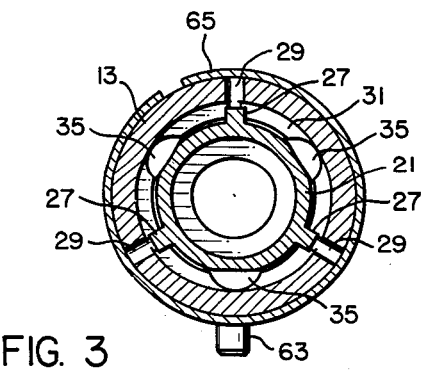
FIG. 3 is a transverse section taken approximately on the line 3—3 of FIG. 2.

The inside of the hub 13 is provided with axial slots or grooves 35 (see FIG. 3) through which the bayonet lugs 27 may pass when the sleeve 21 is being axially inserted in or withdrawn from the hub 13. These slots 35 are, of course, displaced angularly (or in a rotary direction) from the position in which the lugs 27 lie when the parts are normally assembled. In the preferred construction, there are three slots 35 circumferentially spaced equally or 120 degrees apart, and three equally spaced latching recesses or depressions 29 midway between the slots 35, or in other words offset 60 degrees from the slots 35. Conveniently the recesses 29 are formed by radial holes drilled into the hub before it is hollowed out to form the radial surface 31, a little less than half the diameter of each drill hole remaining as a depression in the surface 31 in the finished article. As long as the sleeve 21 remains in the same axial position shown in FIG. 2, with the lugs 27 in the recesses 29 in the surface 31 of the hub, the sleeve cannot turn to bring the lugs 27 opposite the slots 35. To release the sleeve so as to disassemble the outboard flange 15, the sleeve 21 must first be pushed axially inwardly against the force of the spring 33, by hand pressure exerted on the enlarged head 23. Then when the sleeve has been pushed inwardly a short distance, it can be turned to bring the bayonet lugs 27 opposite the respective slots 35, whereupon the sleeve 21 can be withdrawn axially from the hub 31, the flange 15 coming off from the hub with the sleeve.

Figure 5:
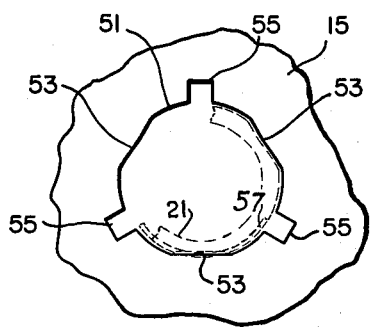
FIG. 5 is an elevation of the central portion of the inner face of the outboard flange of the spool, with a fragment of the lock nut also shown.
Figure 4:
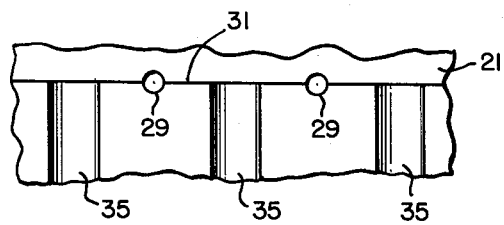
FIG. 4 is a "developed" interior view of a fragment of the hub, looking radially outwardly from the center.

It has been mentioned above that the lock nut or retaining sleeve 21 extends slightly loosely through the outboard side flange 15. It is desirable that although the nut is slightly loose with respect to the flange, it be non-rotatable with respect to the flange and also be permanently secured to the flange so that the nut and the flange will not become accidentally separated in the darkroom, making it difficult to find the nut in the dark. To accomplish this connection, the outboard flange 15 has a central opening 51 (FIG. 5) which, although of generally circular shape, has three flats 53 equally spaced, which mate with three corresponding flats on the exterior surface of the tubular portion of the nut 21. Although the engagement is purposely made a little loose, the flats prevent rotation of the nut relative to the flange 15.

Midway between the flats 53, the central opening 51 of the flange 15 has small radial slots or recesses 55 to form clearance through which the lugs 27 on the lock nut may pass when the lock nut is thrust radially through the flange 15 during the initial assembly of these parts. Upon completion of assembly, the nut is held against removal from the flange 15 by a spring wire clip 57 (FIG. 2) which lies in a circumferential groove on the nut 21, just inside the inner face of the side flange 15. Where the spring wire 57 passes around the cylindrical part of the outer surface of the nut 21, it lies below the surface of the nut, and thus does not interfere with passage of the nut axially into the hub 13. But where the wire 57 passes over the flat spots on the outer surface of the nut, it projects somewhat radially beyond these flat spots and thus overlaps the corresponding flats 53 of the flange 15, serving to prevent complete removal from the flange 15 and holding the nut in an axial position where the corrugated spring 33 is not stressed or is very slightly stressed.

The inner diameter of the respective openings through the sleeve member or nut 21 and through the inner end of the hub 13 is of the right size to fit rotatably on the usual spindle or trunion of the photographic camera or other apparatus with which the spool is to be used. Preferably a part of the length of the opening, such as the part 59 at the outboard end of the sleeve 21, is circular, and the remainder of the length of the opening, both of the nut and of the hub, is of larger diameter except at the inboard end of the hub, where for a short axial length the opening is square in cross section, as at 60, to fit non-rotatably on the usual squared portion of the trunion.

Any desired material may be wound on the exterior of the hub 13, between the two side flanges 11 and 15. When a spool is used in the photographic field, however, the film is ordinarily not wound directly on the exterior of the hub 13, but is wound on the exterior of a plastic core of a standard conventional kind, often called a T core. A portion of such a core is shown in broken lines at 61 in FIG. 2. The inner diameter of the core fits snugly on the external diameter of the hub 13 (being put on or taken off, of course, when the flange 15 is removed) while the exterior diameter of the core forms the surface on which the convolutions of film are wound. To lock the core non-rotatably on the hub 13, the hub is provided at one point with a projection 63 (conveniently formed by a radial pin) which fits into a corresponding groove in the inner surface of the plastic core, in known manner.

For high speed rotation it is important that the core have no looseness on the hub 13. The inner diameter of the core 61 is theoretically standard or uniform, but in actual practice there may be slight variations in the inner diameter of the core. To accommodate cores of slightly varying size without looseness, the hub 13 is provided with resilient means for making a tight fit with the interior of the core.

This resilient means preferably takes the form of a split band 65 of thin resilient metal encircling the hub 13 through part of its axial length, and through all but a small part of its circumference. The band 65 is pressed radially outwardly by resilient means underlying it, such as the circumferentially extending strips 67 of sponge rubber which supply enough radial outward thrust to hold the member 65 snugly against slightly varying internal diameters of any plastic core mounted on the hub 13.

Figures 6, 7:
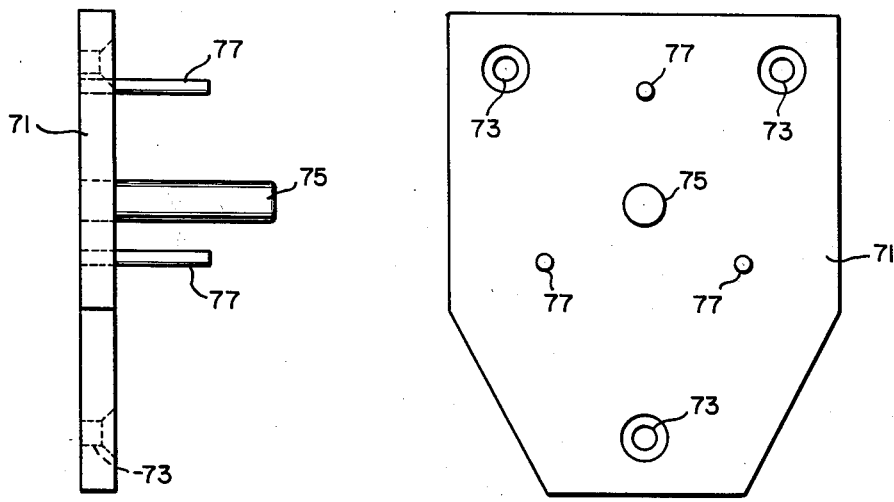
FIG. 6 is a front elevation of the ejector fixture for removing the film core from the spool.
FIG. 7 is a side elevation of the same fixture.

In the photographic darkroom in which a spool of this kind is intended to be unloaded, there is preferably provided an ejector fixture, conveniently mounted on a wall or bench. Such a fixture is shown in FIGS. 6 and 7. It comprises a base plate 71 having holes 73 for receiving screws to fasten the fixture to a wall or other support. Projecting perpendicularly out from the base plate 71 are a central stud 75 of a diameter which will pass easily through the central axial openings in the members 13 and 21, and three shorter and thinner studs or pins 77 at the same angular and radial spacing from the stud 75 as those of the holes 17 in the flange 11, relative to the trunnion opening in the hub.

The spool with the film on it is taken from the camera into the darkroom, if the camera is unloaded in daylight (or is taken out of the camera in the darkroom, under some circumstances) and then the user presses on the enlarged head 23 of the sleeve or nut 21 with his fingers or preferably with the palm of his hand, producing simultaneously a slight twisting or rotary motion. When the sleeve has been pressed far enough axially inwardly, against the force of the spring 33, it can rotate slightly to aline the lugs 27 with the slots 35, whereupon the sleeve or nut 21 can be withdrawn axially and the flange 15 will come off with it. Then the flange 11 with the hub 13 and with the core and film mounted on the hub, is placed on the end of the stud 75 and is manually rotated slightly thereon until the holes 17 come opposite the ends of the pins 77, which condition can be easily felt. Then the flange is firmly pressed against the above-mentioned pins 77, so that these pins, passing through the holes 17, will press the plastic core 61 (with the film on it) axially off of the hub 13, notwithstanding the frictional resistance produced by the tight engagement of the core with the expansible band 65. The film is then processed in the desired manner.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claim.

What is claimed is:

The combination of a camera spool sub-assembly including a spool side flange and a hollow hub rigidly secured at one end to said side flange and projecting axially therefrom, said hub having a periphery forming a seat for a film core on which convolutions of film are wound, said side flange having a plurality of apertures extending through the thickness of said flange in locations opposite a film core seated on said hub, said apertures being at equal distances from the axial center of said hub and equally spaced angularly in a circumferential direction with respect to said hub, and a core ejection fixture comprising a base plate, a stud projecting from said base plate, and a plurality of pins also projecting from said base plate in directions parallel to said stud and at the same distances from the center of said stud as the distances of said apertures from the axial center of said hub and at the same angular spacing from each other as the angular spacing of said apertures, said stud projecting beyond the ends of said pins, so that said spool sub-assembly may first be placed on said ejection fixture by placing the hollow hub on the end of said stud and then may be rotated on said stud until said apertures in said side flange are alined with said pins and then may be thrust axially further onto said stud to cause said pins to pass through said apertures and to press against a film core seated on said hub to displace the core axially from the hub.

References Cited in the file of this patent

UNITED STATES PATENTS

| | | |
|---|---|---|
| 1,232,193 | Bowes | July 3, 1917 |
| 1,479,253 | Rivetta | Jan. 1, 1924 |
| 1,509,441 | Niess-waner | Sept. 23, 1924 |
| 1,578,874 | Wheildon | Mar. 30, 1926 |
| 2,127,772 | Horn et al. | Aug. 23, 1938 |
| 2,881,985 | Overmire et al. | Apr. 14, 1959 |
| 2,986,357 | Foote | May 30, 1961 |

FOREIGN PATENTS

| | | |
|---|---|---|
| 637,614 | France | Feb. 6, 1928 |
| 1,162,574 | France | Apr. 14, 1958 |
| 939,306 | Germany | Feb. 16, 1956 |